(12) United States Patent
Muratov

(10) Patent No.: US 7,667,441 B2
(45) Date of Patent: Feb. 23, 2010

(54) INDUCTIVE ELEMENT FOR A MULTI-PHASE INTERLEAVED POWER SUPPLY AND APPARATUS AND METHOD USING THE SAME

(75) Inventor: Vladimir Alexander Muratov, Manchester, NH (US)

(73) Assignee: Texas Instruments Incorporated, Dallas, TX (US)

( * ) Notice: Subject to any disclaimer, the term of this patent is extended or adjusted under 35 U.S.C. 154(b) by 470 days.

(21) Appl. No.: 11/789,519

(22) Filed: Apr. 25, 2007

(65) Prior Publication Data

US 2008/0265858 A1 Oct. 30, 2008

(51) Int. Cl.
*G05F 1/00* (2006.01)
(52) U.S. Cl. .................. 323/272; 336/170; 336/212; 323/361
(58) Field of Classification Search .......... 336/170, 336/200, 212, 232; 323/272, 261, 355
See application file for complete search history.

(56) References Cited

U.S. PATENT DOCUMENTS

| 5,319,343 | A | 6/1994 | Jeffries |
| 6,362,718 | B1 | 3/2002 | Patrick et al. |
| 6,362,986 | B1 | 3/2002 | Schultz et al. ............ 363/132 |
| 6,545,450 | B1 | 4/2003 | Ledenev et al. ........... 323/272 |
| 7,193,496 | B2 * | 3/2007 | Nakahori ................... 336/170 |
| 7,265,650 | B2 | 9/2007 | Jang et al. |
| 7,352,269 | B2 * | 4/2008 | Li et al. .................... 336/170 |
| 7,398,589 | B2 * | 7/2008 | Younger et al. .......... 29/602.1 |
| 2002/0075113 | A1 * | 6/2002 | Jitaru ........................ 336/170 |
| 2004/0113741 | A1 | 6/2004 | Li et al. ..................... 336/212 |
| 2007/0040644 | A1 | 2/2007 | Jang et al. |

FOREIGN PATENT DOCUMENTS

EP  0472151 A1  2/1992

OTHER PUBLICATIONS

Zengyi Lu et al., "Multi-Phase Inductor Coupling Scheme with Balancing Winding in VRM Applicatons", 2007 IEEE, pp. 731-735.
Chin Sang Bum, authorized officer, International Searching Authority, Notification of Transmittal of the International Search Report and the Written Opinion of the International Searching Authority, or the Declaration, date of mailing Oct. 20, 2008, International Application No. PCT/US2008/061245, International filing date Apr. 23, 2008.

* cited by examiner

*Primary Examiner*—Adolf Berhane
*Assistant Examiner*—Matthew Grubb
(74) *Attorney, Agent, or Firm*—William B. Kempler; Wade J. Brady, III; Frederick J. Telecky, Jr.

(57) ABSTRACT

An inductive element for transforming and/or regulating voltage input from a multi-phase, interleaved power supply system into an output voltage to a load is disclosed. The multi-phase, interleaved power supply system includes a plurality of pulsed power sources, each of which is adapted to provide voltage at a discrete phase. The inductive element includes a magnetic core having, for each power supply, a distinct area of relatively-high magnetic reluctance, which is surrounded by areas of relatively-low magnetic reluctance, and a pair of windings. Each of the pair of windings includes a first, phase winding that is electrically coupled to an output of one of the pulsed power source and to the load, and a second, loop winding that is operatively coupled and proximate to the first, phase winding. Each of the second, loop windings is disposed serially on a closed loop.

6 Claims, 2 Drawing Sheets

INDUCTIVE ELEMENT FOR A MULTI-PHASE INTERLEAVED POWER SUPPLY AND APPARATUS AND METHOD USING THE SAME

CROSS REFERENCE TO RELATED APPLICATIONS (Not applicable)

STATEMENT REGARDING FEDERALLY SPONSORED RESEARCH OR DEVELOPMENT (Not applicable)

BACKGROUND OF THE INVENTION

The present invention relates to devices, systems, and methods for powering modern electronic equipment, such as microprocessors and, more particularly, to devices, systems, and methods for providing high current at low voltage to modern electronic equipment using multi-phase, interleaved power supplies.

Conventionally, a common approach to powering modern electronic equipment with high current, e.g., greater than 100 amperes (A), at low voltage, e.g., about 1 Volt (V), is to combine in parallel several DC-DC converter channels, or phases, to provide a multi-phase, interleaved power supply. This can be done for DC-DC buck converters as well as for DC-DC boost converters.

The common, multi-phase, interleaved approach distributes loading between multiple components, achieving an efficiency that is otherwise not achievable with a single-phase approach. Using multiple, smaller components rather than a single, larger component may also be desirable as a function of available space.

Disadvantageously, due to transients, load currents for modern microprocessors are characterized by a high rate of value change, which necessitates using filtering inductance devices having smaller rather than larger value inductors. Small value inductors, however, increase output current ripple, which magnifies losses and reduces conversion efficiency.

U.S. Pat. No. 6,362,986 discloses means and methods for coupling inductance devices to moderate an increase of ripple in inductance devices and switching devices caused by using small value inductors. For example, referring to FIG. 1, there is shown a two-phase DC-DC power supply 10 having two (N=2) power sources 17 and 19 that are adapted to be 360°/N, or 180°, out-of-phase.

The power supply 10 includes an inductive filter 12 for moderating the ripple increase. The inductive filter 12 has electrically-conductive windings 14 and 16 that are wound in like orientation about rungs 11 and 13, respectively, of a magnetic core "ladder" 15. Typically, there is one winding 14 or 16 for each phase of conversion.

Winding 14 is electrically coupled to a first pulsed power source 17 having a first phase through a switching device (not shown). Winding 16 is electrically coupled to a second pulsed power source 19 180° out-of-phase to the first phase through a switching device (not shown). As current is driven through the windings 14 and 16, magnetic flux is produced. The magnetic flux travels outside and around the magnetic core 15, inducing current to flow through the magnetic core 15. The magnitude and direction of flow of the induced current in the magnetic core 15 depends on the magnitude and polarity of the current in each of the windings 14 and 16.

Switching devices (not shown) are adapted and controlled to activate (energize) and de-activate (de-energize) the windings 14 and 16 to provide the desired result. Thus, the switching devices can be used to cross-couple the windings 14 and 16.

Cross-coupling between windings 14 and 16 causes or prevents interaction between the discrete fluxes and the induced currents generated by each of the windings 14 and 16. Hence, by selectively cross-coupling the fluxes and currents during power supply operation from multiple power sources 17 and 19, phased current ripple associated with the output current can be reduced.

One problem associated with such an arrangement, however, is that the effects and results of cross-coupling between windings that are not immediately adjacent to one another differ substantially from the effects and results of cross-coupling between windings that are in closer proximity to one another. For example, referring to the in-line power supply 20 shown in FIG. 2, the windings 26, 28A, 28B, and 29 are structured and arranged serially along and around the lower flange 24 of the magnetic core 25, rather than around the rungs 21 and 23. As a result, the results of cross-coupling between winding 26 and winding 28A differ from the results of cross-coupling between winding 26 and winding 28B, which differ from the results of cross-coupling between winding 26 and winding 29. This results in varying magnetizing inductances that produce differing phased current ripple and, in some instances, sub-harmonic oscillation of the multiphase power supply 20.

Referring again to FIG. 1, although the distances between the windings 14 and 16 do not vary much, if an additional rung(s) were added to the magnetic core "ladder" 15, the results of cross-coupling between winding 14 and winding 16 would differ from the results of cross-coupling between winding 14 and the winding(s) about the additional rung(s). This, too, would result in varying magnetizing inductances that produce differing phased current ripple and, in some instances, sub-harmonic oscillation of the multiphase power supply 10.

Accordingly, it would be desirable to provide means and methods for providing phase-independent coupling between phase currents by structuring and arranging additional windings in the loop.

BRIEF SUMMARY OF THE INVENTION

An inductive element for a multi-phase, interleaved power supply is disclosed. The inductive element is adapted for transforming and regulating voltage input from plural power sources comprising the multi-phase, interleaved power supply into an output voltage. The multi-phase, interleaved power supply includes a plurality of pulsed power sources, each of which is adapted to provide voltage at a discrete phase.

The inductive element includes a magnetic core that has one or more distinct portions of relatively-high magnetic reluctance. The distinct portion(s) of relatively-high magnetic reluctance is/are, further, completely surrounded by portions of relatively-low magnetic reluctance.

The inductive element includes a pair of windings. Each of the pair of windings includes a first, phase winding and a second, loop winding. The first, phase winding is electrically coupled to an output of a respective pulsed power source and to the load. The first, phase winding is disposed about a portion of the magnetic core having relatively-low magnetic reluctance, but adjacent to a distinct portion having relatively-high magnetic reluctance.

The second, loop winding of each pair of windings is operatively coupled and proximate to the first, phase winding. The second, loop winding is disposed about a portion of the magnetic core having relatively-low magnetic reluctance, but adjacent to the same distinct portion having relatively-high magnetic reluctance. Furthermore, each of the second, loop windings is disposed serially on a closed loop.

Also disclosed are a power converter, a multi-phase, interleaved power supply system, and a method of regulating voltage for a multi-phase, interleaved power supply system using the inductive element.

BRIEF DESCRIPTION OF THE SEVERAL VIEWS OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views.

DETAILED DESCRIPTION OF THE INVENTION

Figure 1:
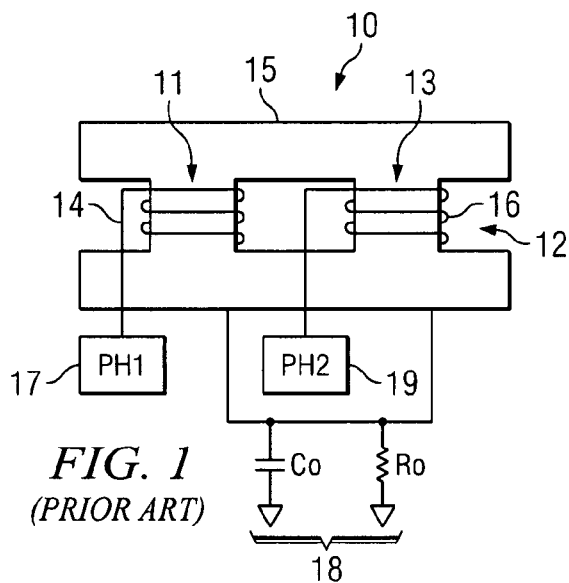
FIG. 1 shows a schematic of a two-phase power supply with a DC-DC converter in accordance with the prior art.
Figure 2:
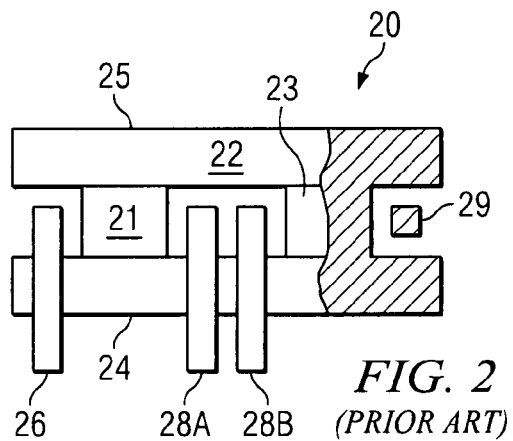
FIG. 2 shows a schematic of a multi-phase, in-line power supply with a DC-DC converter in accordance with the prior art.
Figure 3:
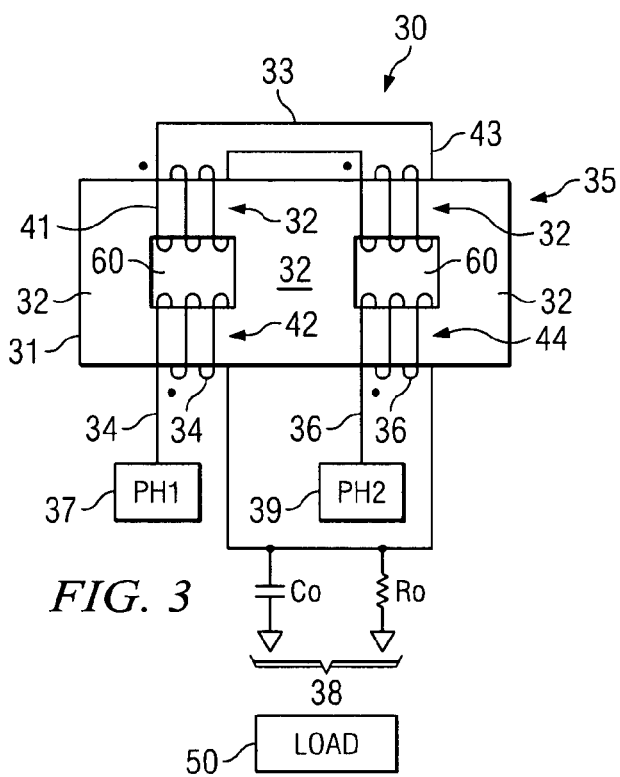
FIG. 3 shows a schematic of a two-phase, interleaved power supply with a DC-DC converter in accordance with the present invention.

An inductive coupling device, e.g., an inductive element, for voltage regulation of a multi-phase, interleaved power supply systems and a system for and a method of regulating multi-phase voltage using the same are disclosed. Referring to FIG. 3, there is shown a two-phase, interleaved power supply system 30 with a DC-DC converter having an inductive element 35. The two-phase, interleaved power supply system 30 includes a first power source 37, e.g., a first pulse generator, and a second power source 39, e.g., a second pulse generator. The first and second power sources 37 and 39 provide staggered-in-time voltage pulses.

The first power source 37 and the second power source 39 are electrically coupled to a load 50 via phase windings 34 and 36, which are made of a highly, electrically conductive material, e.g., copper. Phase windings 34 are electrically coupled to the output of the first power source 37 at a proximate end and to the load 50 at a distal end. Phase windings 36 are electrically coupled to an output of the second power source 39 at a proximal end and to the load 50 at a distal end. The distal ends of the phase windings 34 and 36 are also electrically coupled to an output filter 38, which is shown in FIG. 3 (for illustrative purposed only) as a capacitor $C_o$ and a resistor $R_o$ in parallel.

The first power source 37 provides voltage to the load 50 at a first phase and the second power source 39 provides current to the load 50 360°/N (where N=the total number of power sources) out-of-phase of the first phase, which is to say 180° out-of-phase of the first phase. As a result, voltage pulses are staggered temporally before application to the inductive element 35.

To form the inductive element 35, phase windings 34 from the first power source 37 are structured and arranged about a first portion 42 of a magnetic core 31 and phase windings 36 from the second power source 39 are structured and arranged about a second portion 44 of the magnetic core 31. The first and second portions 42 and 44 of the magnetic core 31 correspond to areas of relatively-low magnetic reluctance, which are immediately adjacent to distinct areas of relatively-high magnetic reluctance 60.

Phase windings 36 are wound in like orientation as phase windings 34. Although the phase windings 34 and 36 shown in FIG. 3 are connected serially, the invention is not to be interpreted or construed as being limited thereto.

The magnetic core 31 can be made from any suitable material having a magnetic permeability that is substantially higher than the magnetic permeability of air, e.g., a ferromagnetic material such as ferrite, and the like. The magnetic core 31 is structured and arranged to provide at least distinct areas of relatively-high magnetic reluctance 60. The at least two distinct areas of relatively-high magnetic reluctance 60 are spatially separated from each other and, further, are surrounded by areas of relatively-low magnetic reluctance 32, 42, and 44.

Loop windings 41 and 43 are operatively coupled proximate to phase windings 34 and 36, respectively, immediately adjacent to the at least two distinct areas of relatively-high magnetic reluctance 60. The loop windings 41 and 43 are electrically coupled serially in a closed loop 33. More particularly, the loop windings 41 and 43 are adapted so that when phase windings 34 and 36 are energized by their respective power sources 37 and 39 with voltage of the same polarity, the voltages induced in the loop windings 41 and 43 are additive. As a result, electrical current flowing through the loop windings 41 and 43 and the closed loop 33 has a higher frequency and less ripple than in the phase windings 34 and 36. This produces small winding losses; however, transient response is improved and output current ripple is less variable.

Figure 4:
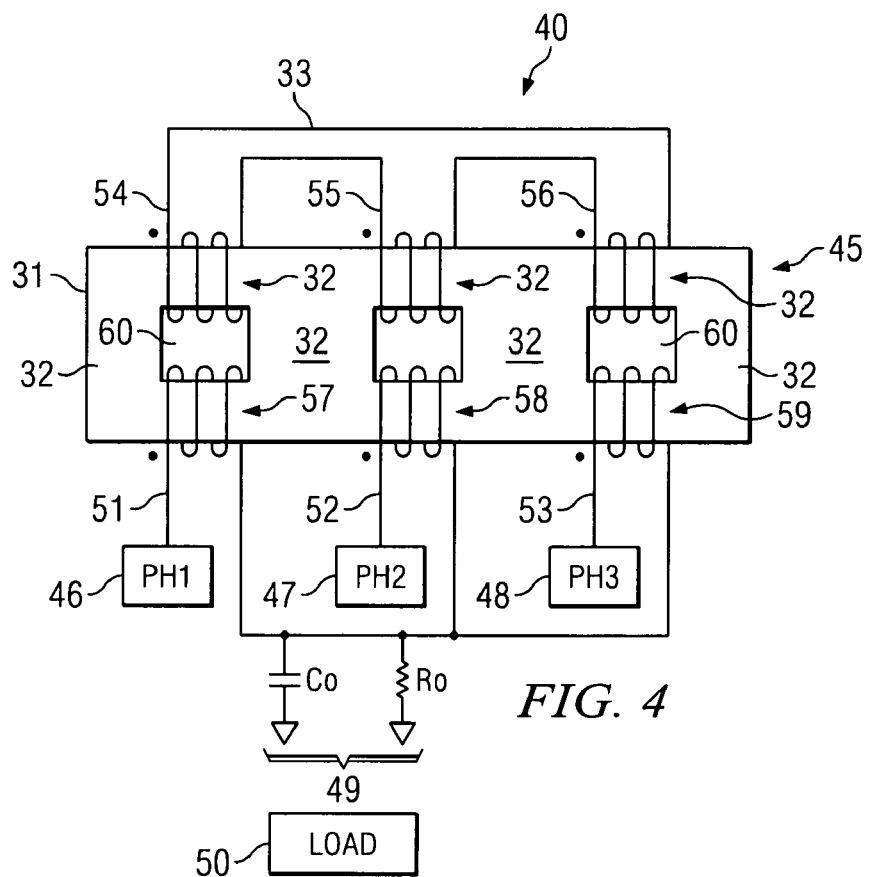
FIG. 4 shows a schematic of a three-phase, interleaved power supply with a DC-DC converter in accordance with the present invention.

Referring to FIG. 4, there is shown a three-phase, interleaved power supply system 40. The three-phase, interleaved power supply system 40 includes a first power source 46, a second power source 47, and a third power source 48. Each of the first power source 46, the second power source 47, and the third power source 48 is electrically coupled to a load 50 via phase windings 51, 52, and 53, respectively. More particularly, phase windings 51 are electrically coupled to the output of the first power source 46 at a proximate end and to the load 50 at a distal end. Phase windings 52 are electrically coupled to the output of the second power source 47 at a proximal end and to the load 50 at a distal end. Phase windings 53 are electrically coupled to the output of the second power source 48 at a proximal end and to the load 50 at a distal end. The distal ends of the phase windings 51, 52, and 53 are also electrically coupled to an output filter 49, which is shown in FIG. 4 (for illustrative purposed only) as a capacitor $C_o$ and a resistor $R_o$ in parallel.

The first power source 46 provides voltage to the load 50 at a first phase. The second power source 47 provides voltage to the load 50 360°/N (where N=the total number of power sources) out-of-phase of the first phase and the third phase, which is to say 120° out-of-phase of the first and third phases. The third power source 48 provides voltage to the load 50 120° out-of-phase of the second and first phases.

Phase windings 51 from the first power source 46 are structured and arranged about a first portion 57 of relatively-low magnetic reluctance of a magnetic core 31 and adjacent to a distinct area of relatively-high magnetic reluctance 60; phase windings 52 from the second power source 47 are structured and arranged about a second portion 58 of relatively-low magnetic reluctance of the magnetic core 31 and adjacent to a distinct area of relatively-high magnetic reluctance 60; and phase windings 53 from the third power source 48 are structured and arranged about a third portion 59 of relatively-low magnetic reluctance of the magnetic core 31 and adjacent to a distinct area of relatively-high magnetic reluctance 60. Windings 52 and 53 are wound in like orientation as windings 51. Although the windings 51, 52, and 53 in FIG. 4 are connected serially, the invention is not to be interpreted or construed as being limited thereto.

Loop windings 54, 55, and 56 are operatively coupled proximate to phase windings 51, 52, and 53, respectively. Distinct areas of relatively-high magnetic reluctance 60 separate the loop windings 54, 55, and 56 from the phase windings 51, 52, and 53. The loop windings 54, 55, and 56 are electrically coupled serially in a closed loop 33. More particularly, the loop windings 54, 55, and 56 are adapted so that when phase windings 51, 52, and 53 are energized by their respective power sources 46, 47, and 48 with voltage of the same polarity, the voltages induced in the loop windings 54, 55, and 56 are additive. As a result, electrical current flowing through the loop windings 54, 55, and 56 and the closed loop 33 has a higher frequency and less ripple than in the phase windings 51, 52, and 53. This produces small winding losses; however, transient response is improved and output current ripple is less variable.

Figure 5:
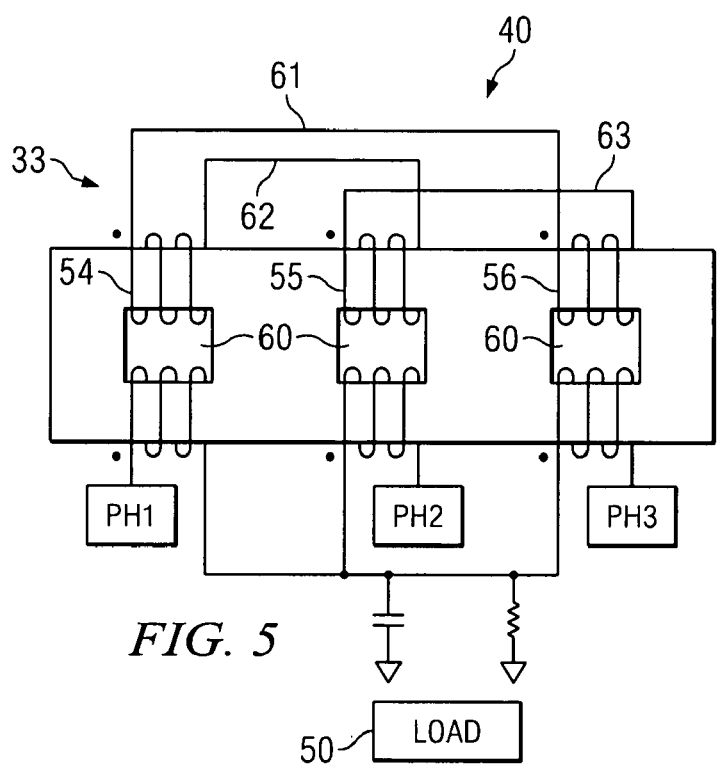
FIG. 5 shows a schematic of an alternate three-phase, interleaved power supply with a DC-DC converter in accordance with the present invention.

FIG. 5 shows a three-phase, interleaved power supply 40 having an alternative closed loop 33 coupling between loop windings 54, 55, and 56.

While the invention is described through the above-described exemplary embodiments, it will be understood by those of ordinary skill in the art that modifications to, and variations of, the illustrated embodiments may be made without departing from the inventive concepts disclosed herein. Accordingly, the invention should not be viewed as limited, except by the scope and spirit of the appended claims.

What is claimed is:

1. An inductive element for transforming or regulating voltage input from a multi-phase, interleaved power supply system into an output voltage to a load, the multi-phase, interleaved power supply system including a plurality of pulsed power sources, each of which is adapted to provide voltage to the load at a discrete phase, the inductive element comprising:
    a magnetic core having a distinct area of relatively-high magnetic reluctance for each power source of the plurality of pulsed power sources, each distinct area of relatively-high magnetic reluctance being spatially separated from every other distinct area of relatively-high magnetic reluctance and surrounded by areas of relatively-low magnetic reluctance; and
    a pair of windings for each of the plurality of pulsed power sources in the multi-phase, interleaved power supply system, each of the pair of windings including:
        a first, phase winding having a proximal end that is electrically coupled to an output of a respective pulsed power source and a distal end that is electrically coupled to the load, the first, phase winding being disposed about a first area of relatively-low magnetic reluctance on the magnetic core adjacent to a first distinct area of relatively-high magnetic reluctance, and
        a second, loop winding that is operatively coupled and proximate to the first, phase winding, the second, loop winding being electrically coupled to a closed loop and being disposed about a second area of relatively-low magnetic reluctance on the magnetic core adjacent to the first distinct area of relatively-high magnetic reluctance.

2. The inductive element of claim 1, wherein, for each power source of the plurality of pulsed power sources, the first, phase winding is wound in like orientation to the first, phase winding of every other power source of the plurality of pulsed power sources.

3. The inductive element of claim 1, wherein the second, loop winding for each power source of the plurality of pulsed power sources is electrically coupled serially in a closed loop to every other second, loop winding associated with every other power source of the plurality of pulsed power sources.

4. A multi-phase voltage converter for transforming or regulating an input voltage from a plurality of pulsed power sources, each of the plurality of pulsed power sources adapted to provide voltage at a discrete phase, into an output voltage to a load, the voltage converter comprising:
    an inductive element having:
        a magnetic core having a distinct area of relatively-high magnetic reluctance for each power source of the plurality of pulsed power sources, each distinct area of relatively-high magnetic reluctance being separated from every other distinct area of relatively-high magnetic reluctance and surrounded by areas of relatively-low magnetic reluctance; and
        a pair of windings for each of the plurality of pulsed power sources, each of the pair of windings including:
            a first, phase winding having a proximal end that is electrically coupled to an output of a respective pulsed power source and a distal end that is electrically coupled to the load, the first, phase winding being disposed about a first area of relatively-low magnetic reluctance on the magnetic core adjacent to a first distinct area of relatively-high magnetic reluctance, and
            a second, loop winding that is operatively coupled and proximate to the first, phase winding, the second, loop winding being electrically coupled to a closed loop and being disposed about a second area of relatively-low magnetic reluctance on the magnetic core adjacent to the first distinct area of relatively-high magnetic reluctance.

5. A multi-phase, interleaved power supply system for providing power to a load, the power supply system comprising:
    a plurality of pulsed power sources, each of the plurality of pulsed power sources adapted to provide voltage at a discrete phase to the load; and
    a voltage converter for transforming or regulating input voltage from each of the plurality of pulsed power sources into an output voltage to the load, the voltage converter comprising:
        an inductive element including:
            a magnetic core having a distinct area of relatively-high magnetic reluctance for each power source of the plurality of pulsed power sources, each distinct area of relatively-high magnetic reluctance being separated from every other distinct area of relatively-high magnetic reluctance and surrounded by areas of relatively-low magnetic reluctance; and a pair of windings for each of the plurality of pulsed power sources, each of the pair of windings including:
- a first, phase winding having a proximal end that is electrically coupled to an output of a respective pulsed power source and a distal end that is electrically coupled to the load, the first, phase winding being disposed about a first area of relatively-low magnetic reluctance on the magnetic core adjacent to a first distinct area of relatively-high magnetic reluctance, and
- a second, loop winding that is operatively coupled and proximate to the first, phase winding, the second, loop winding being electrically coupled to a closed loop and being disposed about a second area of relatively-low magnetic reluctance on the magnetic core adjacent to the first distinct area of relatively-high magnetic reluctance.

6. A method of regulating voltage from a plurality of pulsed power sources, each of the plurality of pulsed power sources adapted to provide voltage to a load at a discrete phase, the method comprising:

interleaving the plurality of pulsed power sources in parallel;

providing an inductive element including a magnetic core having a distinct area of relatively-high magnetic reluctance for each power source of the plurality of pulsed power sources;

providing first, phase windings, each having proximal ends that are electrically coupled to an output of a respective pulsed power source and distal ends that are electrically coupled to the load, for every pulsed power source of the plurality of pulsed power sources, first, phase windings being disposed about an area of relatively-low magnetic reluctance on the magnetic core portion, adjacent to one of the distinct areas of relatively-high magnetic reluctance; and providing second, loop winding that are operatively coupled and proximate to respective first, phase windings, the second, loop windings being disposed about an area of relatively-low magnetic reluctance on the magnetic core portion, adjacent to the distinct areas of relatively-high magnetic reluctance associated with the respective first, phase winding, and being electrically coupled serially to a closed loop.

* * * * *